United States Patent [19]

Beidler

[11] Patent Number: 4,760,776
[45] Date of Patent: Aug. 2, 1988

[54] MOBIL BARBEQUE CART

[76] Inventor: Donald Beidler, R.D. #2, Box 341, Douglassville, Pa. 19518

[21] Appl. No.: 890,163

[22] Filed: Jul. 25, 1986

[51] Int. Cl.⁴ .............................................. A47J 37/04
[52] U.S. Cl. .................................... 99/421 H; 99/419
[58] Field of Search ......... 99/421 R, 421 H, 421 HM, 99/421 HV, 421 M, 419, 420, 443

[56] References Cited

U.S. PATENT DOCUMENTS

| | | | |
|---|---|---|---|
| 2,494,448 | 1/1950 | Nassif | 99/421 HH |
| 2,939,384 | 6/1960 | Vinson | 99/421 HH |
| 3,939,761 | 2/1976 | McGinty | 99/421 H |
| 4,158,991 | 6/1979 | Nakashima | 99/421 H |

FOREIGN PATENT DOCUMENTS

| | | | |
|---|---|---|---|
| 0109028 | 5/1984 | European Pat. Off. | 99/419 |
| 527097 | 5/1955 | Italy | 99/421 H |

Primary Examiner—James Kee Chi
Attorney, Agent, or Firm—Leonard M. Quittner

[57] ABSTRACT

A mobile barbeque cart is disclosed that features means to rotate the burner tubes and maintain the flame in a vertical plane when used on sloping terrain. The novel design also permits the use of any given number of spits which may readily by self-engagingly mounted for rotation. This latter feature is accomplished by means of sprocket wheels mounted at the free ends of the spits the lower teeth of which engage the upper side of an endless chain. The endless chain is horizontally and vertically supported by a chain support which maintains the chain in driving engagement with the lower teeth of the sprocket wheels.

4 Claims, 2 Drawing Sheets

MOBIL BARBEQUE CART

FEDERALLY-SPONSORED RIGHTS

The invention herein was made without any Federal sponsorship or contribution.

CROSS-REFERENCE

There are no cross-references to, nor are there any related applications.

BACKGROUND OF THE INVENTION

1. Field of the Invention

This invention relates to outdoor cooking and more particularly to a mobile barbeque cart of the kind in which food, such as chickens or loins, are roasted while mounted on a rotating spit. The barbeque of this invention is adapted to receive any of a number of horizontally disposed, parallel, spaced apart spits and engage them for rotation about their elongated axes.

2. Description of the Prior Art

An outdoor barbeque for grilling on spits which must be turned by hand is shown in U.S. Pat. No. 4,154,154. Mechanized versions of this type of barbeque are shown, for example, in U.S. Pat. No. 2,577,184 in which a crown fitting is mounted at the end of a spit for slidable engagement with a rotatable drive shaft; U.S. Pat. No. 2,588,091 utilizes a spit having a rectangular cross section that is inserted into the bore of a stub shaft; similarly U.S. Pat. No. 2,908,831 discloses a pit that is received in a passageway of polygonal cross section.

U.S. Pat. Nos. 3,361,055 and 3,866,527 utilize worm gears to engage spur gears that rotate the spits. The U.S. Pat. No. 3,866,527 is of particular interest since it illustrates a variation of a preferred embodiment of this invention in which the barbeque cart is a dual unit in that spits are accommodated from both sides of the cart and supported at their remote ends by a common interior partition.

SUMMARY OF THE INVENTION

These and other objects of this invention are achieved by mounting sprocket wheels at the outboard ends of the spits, the lower teeth of which engage the upper side of an endless chain, which chain is held oriented in both horizontal and vertical planes by means of a "U" shaped channel chain support. Additionally, gas burner tubes are rotatably mounted about their horizontal axes toward a low or cold region of the barbequing chambmer created when the cart sits on sloping ground when the cart is situated on sloping terrain.

An object of this invention is to provide a barbeque cart of the type in which food to be roasted is mounted on a rotatable spit and the spit is held in self-seating engagement with an endless chain thus making it unnecessary to manipulate the spit into mechanical engagement with a drive means.

Another object of this invention is to provide a gas fired mobile barbeque cart in which the gas burners can be positioned to maintain a directed flame toward the cold region of the barbequing chamber even when the cart is located on sloping or uneven ground.

Another object of this invention is to provide a barbeque cart that permits any desired number of spits to be driven by a single endless chain and individually inserted on or removed from the cart without disturbing the other spits.

Other objects, advantages and features of the present invention will be apparent to those skilled in the art from the following description taken in conjunction with the accompanying drawings.

BRIEF DESCRIPTION OF THE DRAWINGS

The present invention may be better understood by reference to the drawings wherein four (4) figures are shown on two (2) sheets. The numbers shown on the drawings for the various parts of the invention are consistent throughout so that a number indicating a part in one drawing will indicate the same part in another drawing.

DETAILED DESCRIPTION OF THE DRAWINGS

Figure 1:
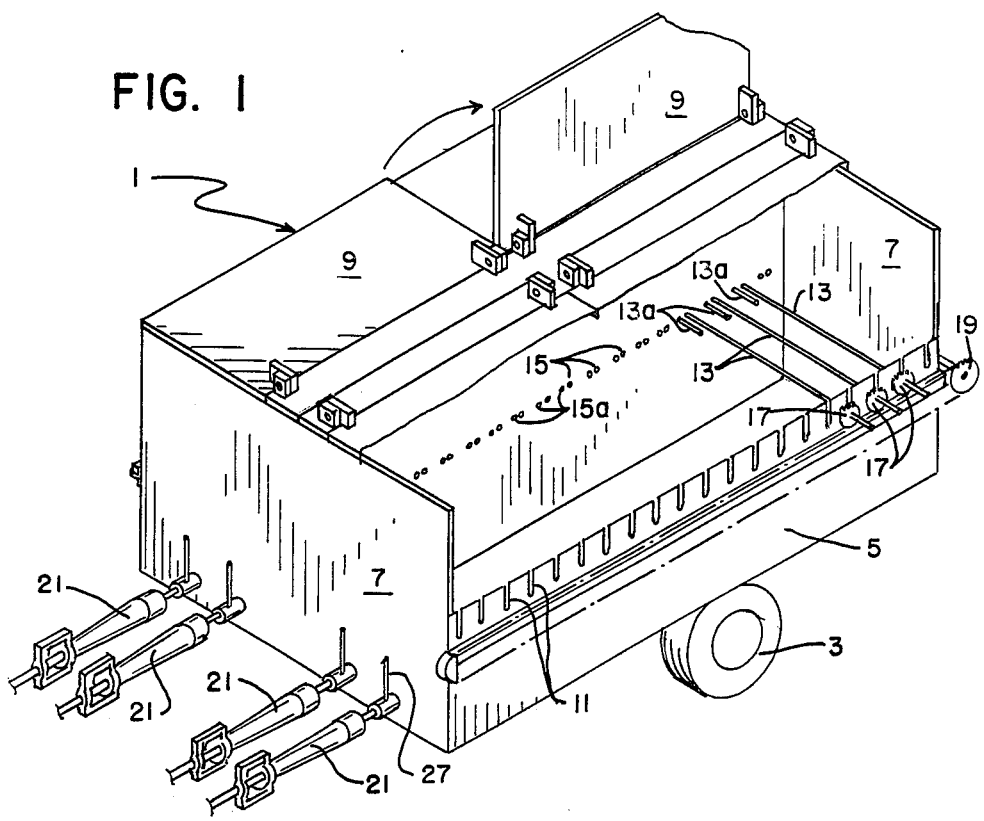
FIG. 1 is a perspective view, partially cut away, of the barbeque cart of this invention.
Figure 2:
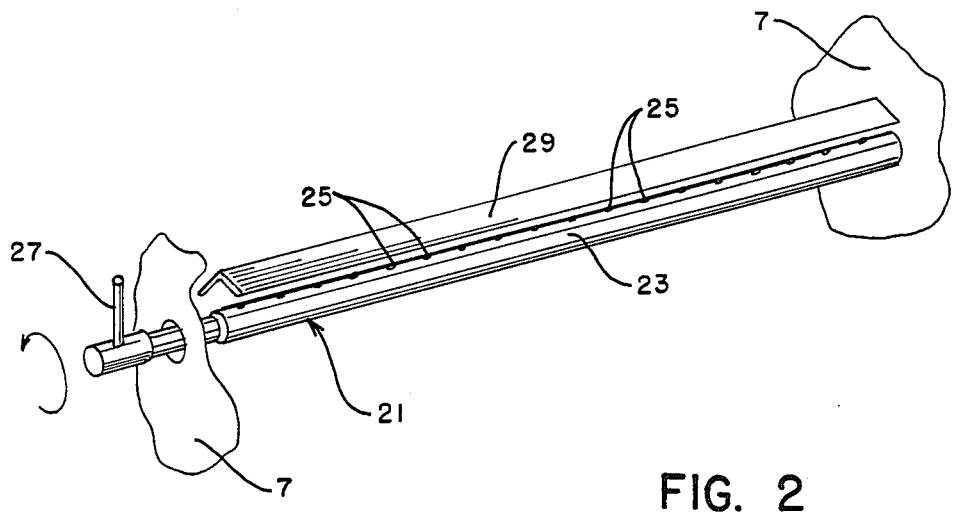
FIG. 2 is a perspective view of a gas burner of the barbeque cart.

Referring to FIG. 1 there is generally shown an outdoor barbeque device (1) mounted on wheels (3) to facilitate moving the cart from one location to another. The cart is made of side walls (5), and end walls (7) and is enclosed at its top by hinged access covers (9), to form a broiling chamber.

Slots (11) are positioned at the upper edge of side walls (5) which are adapted to receive the outboard ends of the spits (13). The inboard ends of the spits are received for rotation within holes (15) oppositely mounted. As illustrated in FIG. 1, the cart is a dual structure adapted to hold a set of spits on each side of the cart. The right hand side of the cart as shown in FIG. 1 is broken away to show the positioning of spits (13) whereas only the stub ends of the spits (13a) mounted in the left side of the cart are shown as passing through holes (15a).

Spit sprocket wheels (17) are mounted on the free or outboard ends of spits (13) and are adapted to engage the upper surface of an endless chain (41) for rotation. Gas burners (21) are inserted through one of the end walls (7). Each burner (21) is comprised of an elongated burner tube (23) having a single series of orifices or gas jets (25) linearly disposed along its horizontal axis at the top of the tube. The burner tubes (23) are mounted for rotation in the end walls (7) and have handles (27) in vertical alignment with the gas jets (25) to facilitate turning. A flame shield (29), in the form of an inverted "V" is mounted in end walls (7) to distribute the flame to protect the gas jets (25) from falling debris from a grate (not shown) or spits (13) mounted above the burner tubes.

A motor (31) is mounted on one of the ends walls (7) and is linked mechanically ad serriatum through a motor sprocket (33), a chain drive (35), a drive sprocket (37), and a shaft (39) to a pair of widely spaced end sprocket wheels (19). The first end sprocket (19) in turn engages and drives the endless chain (41) which meshes with an underside of the spit sprockets (17) and thereafter to the second end or idler sprocket (not shown). The endless chain is held in engagement with the spit sprockets by means of a chain support (43) in the form of a "U" shaped channel which prevents the endless chain from moving downwardly, as by gravity, or laterally out of engagement with the sprockets. Lastly, a guard (45) having slots (47) is removably mounted over the end sprocket to prevent inadvertent contact of the body or clothing of an attendant with the sprockets and the chain. An upstanding portion (49) of the guard effectively extends the side wall (5) to the upper edge of the barbeque cart and end wall (7) to form an edge upon which the hinged covers may be closed and secured.

In operation the cart (1) is wheeled into a suitable location for use. If the ground is uneven or slopes from one side of the cart to the other, the burner tubes (23) are rotated by means of the handles (27) so that the gas jets (25) will be vertically disposed as nearly as possible, thus assuring uniform distribution of the flame under the spits and throughout the broiling chamber and eliminating the cold region in the chamber created by the slope of the cart.

Meat to be broiled, such as chicken, loins, small game or the like is mounted on the spits. The inboard ends of the spits are inserted into the supporting holes (15) and the outboard ends laid down into the slots (11) so that the spits will be supported at each of their ends. When the spits are inserted into the slots the spit sprockets (17) are positioned outboard of the wall (5) of the cart (1) and rested directly upon the endless chain. This is an important feature of the invention since the spits can be laid directly onto the chain (41) in mechanical engaging relationship without the complications or complexities known to the prior art. The guard (45) is then positioned over the spit sprockets to protect the operation or his clothing from inadvertent engagement with the moving parts. The free standing side walls (49) of the guard (45) extend upwardly (not shown) to the upper edge of end walls (7) so that when the covers (9) are rotated into a closed position, the space within the cart in which the spits are located can be closed to form the broiling chamber.

Figure 3:
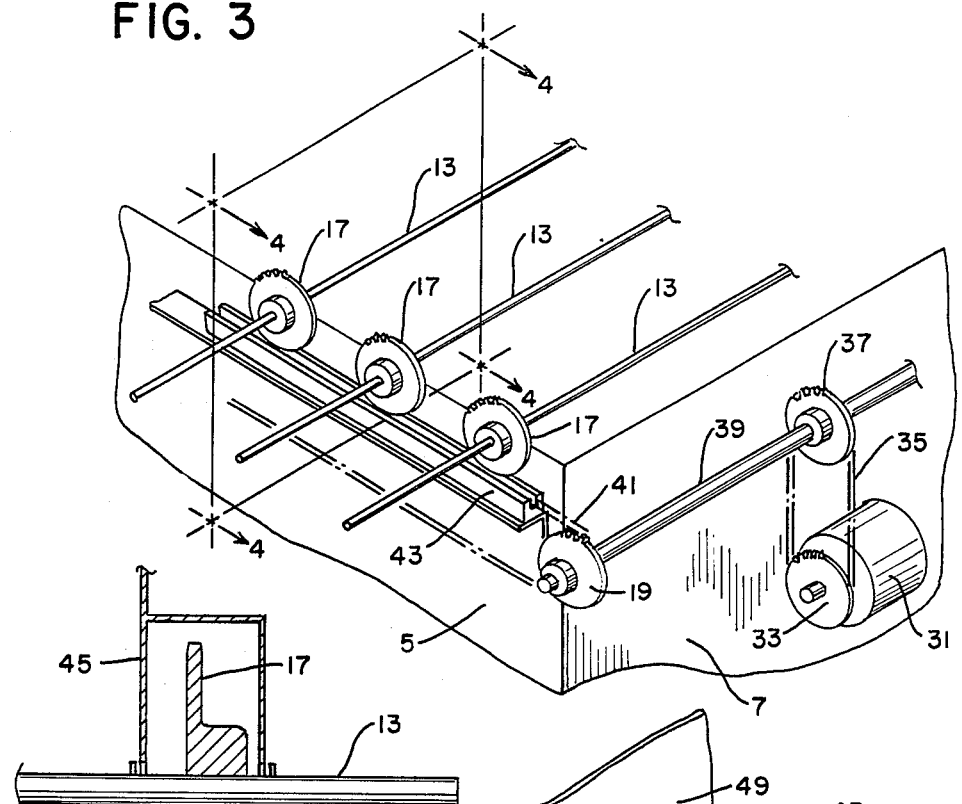
FIG. 3 is a schematic view in perspective of a portion of the barbeque cart illustrating the preferred means for rotating the barbeque spits.
Figure 4:
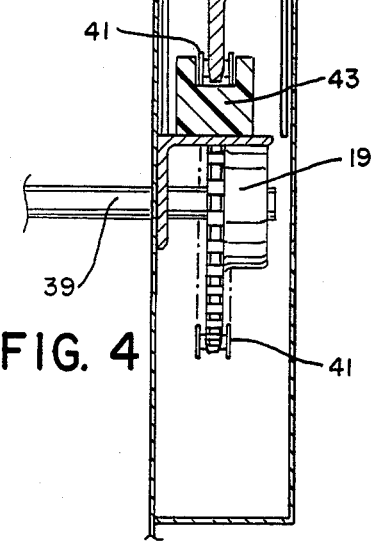
FIG. 4 is a sectional view in side elevation taken through the plane 4—4 of FIG. 3.
Figure 5:
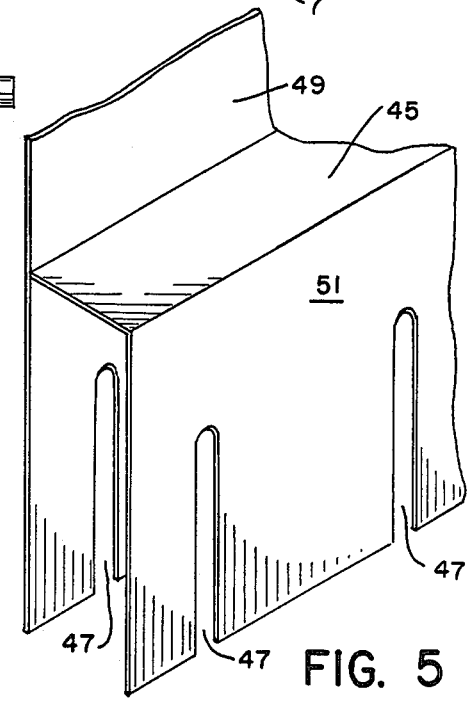
FIG. 5 is a detail showing a portion of a shroud used to enclose the chain drive used to rotate the barbeque spits.

When the gas passing through the jets (25) of the burner tubes (23) is ignited, the motor (31) is energized causing the motor sprocket to turn the drive chain (35) which causes the shaft (39), and the first end sprocket to rotate. It will be understood that only one half of the operating mechanism of cart one is shown in FIG. 3 and that the drive shaft (39) extends equally in the opposite direction to rotate an end sprocket on the other side of the cart. The end sprockets on both sides of the cart engage and drive the endless chain which, as previously mentioned, engages the bottom teeth of spit sprockets so that the linear motion of the endless chain passing beneath the spit sprockets causes the spits to rotate. As mentioned above, the chain support which is a simple "U" shaped channel section made out of a wear resistant plastic or metal, supports the endless chain and holds it horizontally in driving engagement with the spit sprockets. By this means it becomes possible merely to lay the spits into the slots without need for threading the chain over the sprockets or otherwise mechanically linking the spits (13) to drive devices as required in the prior art.

The design of the mobile barbeque cart of this invention provides two principle advantages over similar prior art devices:

a. even though the ground slopes, the burner tubes can be rotated to maintain the flame in a vertical plane pointing directly upwards toward the food being grilled on the spits thus assuring uniform heat throughout the broiling chamber; and b. any selected number of spits may be used and rotated simply by inserting their inboard ends through the support holes (15) and laying the outboard, sprocketed ends of the spits into the slots to seat the spit sprockets in self-engaging relationship with the endless chain drive. The drive force suffices to maintain this engagement since the chain is supported in the "U" shaped chain support maintaining a proper alignment in both the vertical and horizontal plane.

Since many modifications, variations and changes in detail may be made to the presently described embodiments, it is intended that all matter in the foregoing description and accompanying drawings be interpreted as illustrative and not by way of limitation.

I claim:

1. A barbecue cart for broiling comestibles on spits over an open fire in which the barbecue cart includes a structure having a floor, sides, end walls and a removable top; the structure supporting in order of ascending height within the structure:
   a plurality of elongated burner tubes each having a single line of gas orifices spaced along the principal axis of the tubes;
   a flame shield spaced above the gas jets;
   a plurality of spits mounted for rotation adjacent their ends and upon which comestibles may be skewered;
   the improvement comprising:
   an open hole in an upstanding wall of the barbeque cart adapted to receive one end of a spit;
   a slot open at its upper end on a side wall of the barbeque cart adapted to receive the other end of the spit;
   a spit sprocket wheel mounted adjacent the other end of the spit and adapted to be positioned outboard of the side wall when the spit is inserted in the slot;
   an endless chain drive adapted to engage the lower portion of the spit sprocket wheels extending horizontally and supported for rotation at their one end by a drive gear and at their other end by an idler gear;
   a horizontal disposed U shaped channel chain support guiding the upper portion of the endless chain in driving relationship with the lower teeth of the sprocket wheels; and
   motor means associated by means of appropriate mechanical power transmitting devices with the drive gear to cause the drive gear, the chain, the sprocket wheels and the spits to rotate.

2. A barbeque cart according to claim 1 wherein the upstanding wall is a side wall of the cart opposite to the slotted side wall.

3. A barbeque cart according to claim 1 wherein the upstanding wall extends along the center line of the cart and serves to support spits mounted from either side of the cart.

4. A barbeque cart according to claim 1 wherein the burner tubes are mounted in the end walls for rotation.

* * * * *